Dec. 12, 1939.   K. C. EIKEL   2,182,891

PROCESS OF MEAT TREATMENT

Filed Sept. 16, 1938

INVENTOR
Karl C. Eikel
BY Carl C. Batz
ATTORNEY

Patented Dec. 12, 1939

2,182,891

UNITED STATES PATENT OFFICE 2,182,891

PROCESS OF MEAT TREATMENT

Karl C. Eikel, Chicago, Ill., assignor to Armour and Company, a corporation of Illinois Application September 16, 1938, Serial No. 230,237

10 Claims. (Cl. 99—107)

This invention relates to a process of meat treatment and more particularly to a process for treating cured uncooked hams to render the ham suitable for slicing into sections of uniform size and quality. This application is a continuation in part of my copending application, Serial No. 166,849, filed Oct. 1, 1937.

I have learned that there is great commercial opportunity in marketing a ham product in sliced form when the slices are uniform in size and quality and when the parts of the slice can be kept firmly united upon slicing. Such a sliced product has open to it new channels of distribution because delicatessen stores, grocery stores, etc. may sell such a product as well as meat markets. Since the slices are uniform in size and quality the retailer is not compelled to carry the variety of cuts such as shanks, butts, and middle portions, and there is the great advantage that no weighing is necessary. From the consumer's point of view also the sliced product is superior because the exact amount desired may be purchased from the retailer whether one pound, six pounds or other amount, with the absolute assurance that all slices will be alike and ready for the broiler or frying pan. These factors and others not here mentioned render such a product of great commercial importance.

Prior to this invention, however, it has not been known how an uncooked ham product capable of being sliced into sections of uniform size and quality could be produced, and an important object of this invention is to discover a method of treatment whereby such a ham product can be prepared. It is further desired that the meat be subjected to a smoke treatment and that the product obtained contain the same flavor as is associated with the first quality smoked whole hams.

Several obstacles have stood in the way of the production of a product which could be sliced as above explained. Among the more serious of these is the problem of making the different portions of the meat come together to produce an internally bound unified mass of uniform cross section; and another factor which complicates this problem is the fact that the smoking treatment necessary to the desired flavor involves elevated temperatures and drying influences which operate deleteriously on attempts to produce a unified piece of meat of uniform cross section. These and other difficulties have, in the past, prevented the introduction of the uniform sliced ham product on the market.

I have discovered a method of treatment which overcomes the above obstacles and enables the marketing on a commercial scale of uniform ham slices. In my improved method the ham is first boned while pliable and soft, and then pressed in a mold, being wrapped and handled in a manner which will later be described in detail. While still in the mold, the ham is chilled; and after this it is removed from the mold and subjected to a smoke treatment carried out at elevated temperature. After being smoked and while still at the elevated temperature the ham is again pressed in a mold of uniform cross section, and is then chilled while still in the mold to set the meat in its desired form ready for slicing into uniform slices. The following detailed explanation will clarify the purposes of the steps above outlined and give the reasons for their order.

Figure 1:
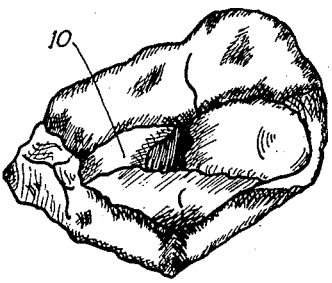
Fig. 1 is a perspective view of a ham just after the boning operation has been performed, this view showing the butt end of the ham.

The figures given illustrate the condition of a ham as it passes through the several steps of my new process. As shown in Fig. 1, the ham is boned and ready to be wrapped for the initial pressing. In reaching this state the ham has already been cured, skinned, soaked and suitably prepared for boning. The curing and other preparatory operations will not be described in detail, however, for these may be performed in any satisfactory way and form no part of this invention.

The curing operation may comprise passing the ham through several brine baths of specific content so as to "pickle" the meat and preserve it from spoilage. The skinned cured hams may be treated in one of two ways. In the case of the lighter hams the ham may be left whole, but in the case of the heavier hams it may be desired to sever the ham squarely at the hock joint, and remove the shank end. The removal of the shank end of the ham does not materially alter the subsequent steps of the treatment except at the boning operation.

Prior to being boned the hams are preferably soaked for about an hour and a half in water having a temperature in the neighborhood of 70° F. This renders the hams soft and pliable and in the best condition for boning. At the boning table the excess fat is removed from the meat and the bones removed preferably in the following manner:

In the case of whole hams where the shank portion is left on the ham, the bones are removed by slitting the hams longitudinally along the shank and aitch bones and trimming these bones free of the meat. The femur bone, which connects the aitch and shank bones, is then chiseled about from both ends and this bone pulled longitudinally out of the meat. The shank end of the ham is then tucked into the passage left by removal of the femur so as to leave the meat in a more compact form. If desired, one or more stitches may be run longitudinally through the meat to hold the tucked-in portion in place.

In case the shank end has been removed from the ham, the boning operation is the same as above explained with respect to the removal of the aitch and femur bones. In this operation the shank end can not be turned into the femur cavity to the extent above set out. In either mode of operation the deep fissure or cavity left by the removal of the aitch bone and the roughness at the shank end due to the removal of the remaining bones, are unavoidable. In some cases it is preferable to use a limited number of stitches to tie the sides of the aitch cavity in place.

Figure 2:
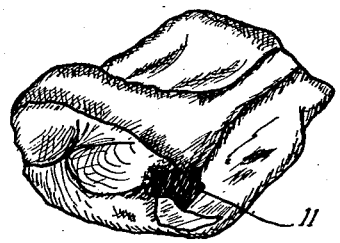
Fig. 2 is another perspective view of the ham shown in Fig. 1, this view showing the shank end of the ham.

Figs. 1 and 2 of the drawing show a boned ham which has previously had the shank end removed, and illustrate the aitch bone cavity 10 at the butt portion of the ham and the end roughness and cavity 11 at the shank end due to the removal of the femur. It will be observed that the exterior of the boned ham is very irregular, having numerous fissures and protuberances.

Figure 3:
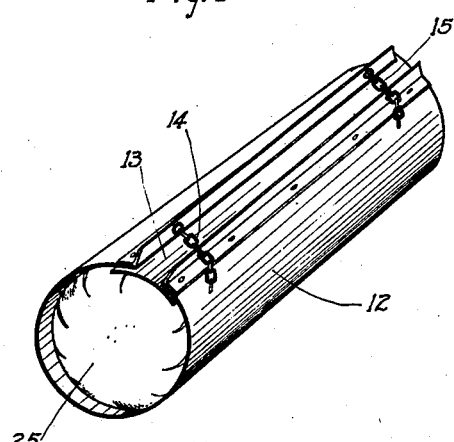
Fig. 3 is a perspective view of a mold enclosing a boned ham suitably wrapped, the mold being shown closed securing the ham in compressed condition.

The boned cured ham as shown in Figs. 1 and 2 is, while still soft and pliable, wrapped in a piece of cloth 25 such as heavy muslin and then placed in a mold as shown in Fig. 3. In wrapping the cloth about the ham it is important that the cloth be brought well over the end portions and tight over the aitch bone cavity, so that upon pressing in the mold the entire ham will be brought under compression causing all cavities to be filled and the surface evened.

The mold as shown in Fig. 3 consists of a substantially cylindrical metal part 12 which is resilient and can be expanded to permit the boned ham to be inserted. The filled mold may be placed in any suitable power press and after the initial stroke of the press the tongue 13 may be inserted and the ham laterally pressed to the condition shown in Fig. 3. The chains 14 and 15 when fastened hold the mold closed to maintain the lateral compression of the ham. I have found that a satisfactory pressing is had when about 60 pounds pressure is applied to the mold which has been found sufficient to reduce the cross section of the meat to about 6 inches in diameter. It will be observed that the metal part 12 has open ends, and that the ends of the ham are not completely squared by this operation but are compressed by the cloth so as to smooth the end surface of the meat. It is obvious that other specific devices may be used to effect the compression necessary for this step of the method.

While still in the mold the ham is next transferred to the cooler which may have a temperature of from 30 to 50° F., and are left in the cooler long enough to allow the meat to firm or set. Satisfactory results are obtained if the hams are allowed to remain over night in the cooler.

During the above pressing operation the ham meat is warm and pliable and is possibly from 60 to 70° F. in temperature. The compression given it serves effectively to close the bone cavities and to smooth the surface outline. After the meat has been chilled, the form given it by the pressing operation is retained and the meat is then stiffened so that no distortion takes place when it is removed from the mold. However, it is believed that the surfaces which have been brought together by the pressing operation are not yet united and bonded. The purpose of this initial pressing is to form the meat, smoothing the surfaces and closing the cavities so that the smoke treatment may thereafter penetrate evenly into the meat and without directly contacting the surfaces of the various parts to be united. The chilling subsequent to the initial pressing is for the purpose of setting and firming the meat in its pressed form so that the meat can be admitted undistorted to the smoke atmosphere.

When the hams come from the cooler after the initial chilling the mold and cloth are removed. Preferably the hams are then wrapped in cellulose sheets 26 which further serve to bind the hams in their pressed form during the smoke treatment. These sheets also serve to retain the juices within the meat while at the same time allowing penetration of the smoke treatment.

Figure 4:
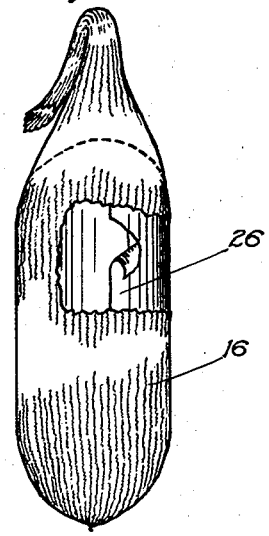
Fig. 4 is an elevational view showing the ham suitably hung for the smoke treatment, a portion of the stockinette being shown broken away to expose the cellulose wrapping.
Figure 5:
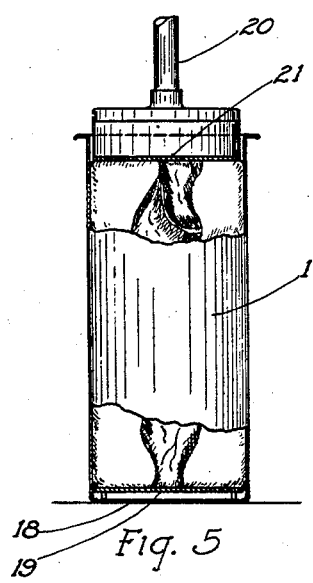
Fig. 5 is a broken elevational sectional view of the ham as it is being longitudinally pressed after smoking.

Next the hams are placed in porous bags or stockinettes, such as the bags 26 shown in Fig. 5, the hams being hung preferably with the butt end of the ham lowermost on a smoke tree to be transferred to the smoke room. The smoke room may have a temperature in the neighborhood of 155 or 160° F. Here the ham receives the smoke treatment and may attain an internal temperature of about 137° F. in about 10 or 12 hours. Preferably the smoke treatment is continued at the same smoke room temperature for a period of at least 6 hours longer, at which time the ham may have an internal temperature of 140° F. or higher. Fig. 4 of the drawing is intended to illustrate the condition of the ham after smoke treatment has been applied. Here the ham is shown wrapped in the cellulose sheets 15 and suspended in the stockinette 16. An additional advantage gained by the use of the cellulose wrapping is in preventing the sticking of the meat to the stockinette upon smoking.

When the smoke treatment is completed, the stockinettes are removed and also the cellulose wrappings. It may be found that the cellulose wrappings have adhered to the meat but I have discovered that these may easily be removed by a dash or spray of warm water over the outside of the hams.

With the cellulose wrappings removed and while the hams are yet hot from the smoke treatment, they are placed into a mold such as is shown in Fig. 5. The mold here shown comprises a solid cylindrical piece 17 which has a bottom flange 18 and is substantially the same in cross section as mold 12 in closed condition. The bottom plate 19 of the mold is spaced from the flange to permit any excess liquid to pass from the bottom of the mold. The hams are placed into cylinders 17 preferably with the shank end down, and longitudinal pressure applied at the end of the ham through means such as the air pressure member 20. Advantageously the pressure should be applied gradually allowing full opportunity for the meat to reach all voids. I have found that a final pressure of about 60 pounds is satisfactory. It is undesirable that the ham be pressed at this stage more than necessary for filling all voids because the meat is subject to injury and losses of valuable juices may take place. It is, however, necessary that the surfaces of the meat which have been brought together by the initial pressing be again brought firmly into contact and that the opposite ends be squared perfectly. Any suitable clamping means may be used to hold the top plate 21 tightly against the ham and maintain the ham under compression.

Figure 6:
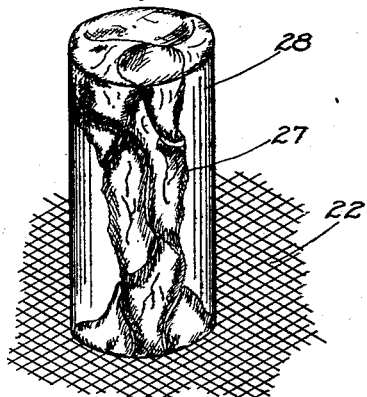
Fig. 6 is a perspective view of the finished product after removal from the final mold and ready for slicing.

After this final pressing the ham, while still encased within the mold, is placed in a cool room and chilled. Preferably the cool room may have a temperature of around 40° F. After the meat has cooled to set and firm it, which may take for example about 24 hours, it is pressed lengthwise out of the cylinder 17 and set on end in a room of about 28 to 32° F. on a suitable supporting surface such as the mesh screen 22 shown in Fig. 6. In Fig. 6 the character 27 is intended to designate the lean portion while character 28 designates the more fatty portion. Preferably the ham is left in this condition for 48 hours or more. If left for such length of time at this cool temperature the meat is finally firmed and hardened ready for slicing. An optional procedure would be to completely chill the meat while still in the cylinder 17 and then remove the completely firmed meat from the cylinders. However, I have found that there is less likelihood of breakage if the meat is removed after it has set but before it has become too stiff. I find that an advantage is gained by removing the cellulose materials prior to the final pressing since this eliminates difficulty in removing the chilled ham from the mold and thereby avoids breakage. Other specific devices may be used in effecting this final pressing. It is understood that considerable variation may be had from the times and temperatures given in the method herein described. Though the initial chilling step as herein described is advantageous, it may in some cases be omitted where other means such as a firm cellulose wrapping is used to retain the pressed form of the meat during smoking.

The final product as shown in Fig. 6 is uniform and without internal cracks. The surfaces which it was necessary to bring together in order to attain this form have been firmly knitted and when the cylindrical shaped product is sliced, for example in slices of ¼ inch thickness, the slices may each weigh, for example, exactly one-half pound. A peculiar virtue of the product lies in the fact the slices will be as unbroken disks of meat, interiorly unified. With the meat in this form there will be no wastage on slicing because the end portions will be of the same size and quality as the middle portions.

I attribute the excellent knitting of surfaces within the meat to the congealing of the gelatinous material between these surfaces while the meat is under final compression. If the meat is broken apart and examined after the smoking treatment at the stage it is to be subjected to the final pressing, it will be found that the surfaces are tacky. I believe this characteristic is due to the partial hydrolysis of the collagen through enzymatic action or otherwise to form a gelatinous material which upon cooling knits the parts together, but I do not wish to be understood as disclaiming any right to this feature should it be discovered that the binding influence is based on a different theory.

I find that the action of the final compression and chilling to knit the product into a unified mass is dependent on the initial pressing operation, for if the bone cavities and ragged edges be exposed directly to the smoke treatment these surfaces and cavities are so acted upon by the smoke treatment as to prevent their effective union in the final pressing and chilling operations. Should the initial pressing be omitted, though the final pressing be sufficient to bring the meat into proper form, the product would not be unified because the surfaces having been subjected to the smoke will not thereafter knit.

It will be apparent that to obtain the desired flavor the product must at some time be subjected to a smoke treatment, and that for obvious reasons the bone must be removed. The other steps of my improved method must be had in definite order with respect to the boning and smoking operations. The initial pressing forms the meat and removes the exposed irregularities and must be performed before the smoke treatment or the final steps will not be effective.

The final pressing must be performed after the smoke treatment or the final form will not be cylindrical and the internal surfaces will not held in contact to enable knitting upon the final chilling.

While I have given a very specific practice for carrying out the invention, it is understood that many changes may be made without departing from the spirit of the invention. For example, though in the description given the ham is formed into cylindrical shape, it may be pressed into any other desired shape preferably of uniform cross section; and though the detailed description deals specifically with a ham, other desired cuts of meat might be treated likewise. It is understood that the invention has its peculiar application in the preparation of uncooked cured meat products and must be clearly distinguished from methods adaptable only to cooked or ground meat products.

The foregoing detailed description has been given for clearness of understanding only, and no unnecessary limitations should be understood therefrom.

I claim:

1. A process of meat treatment comprising removing the bone from a piece of uncooked meat, compressing said boned meat to remove the bone cavity and smooth the surface outline, chilling said meat while under compression to prevent the return of irregular surface characteristics and bone cavity when said compression is released, subjecting said meat to a smoke treatment at an elevated temperature, compressing said meat at an elevated temperature to cause it to assume a predetermined form of uniform cross section and with sufficient pressure to bring all parts of said meat into firm contact, and chilling said meat while under said last-mentioned compression to congeal said meat into close coherence in said predetermined form.

2. A process of meat treatment for preparing a ham for slicing comprising: compressing a boned cured ham while in a soft pliable state to remove the bone cavity and smooth the surface outline, chilling said ham while under compression to prevent the return of irregular surface characteristics when said compression is released, subjecting said ham to a smoke treatment at an elevated temperature, compressing said ham at elevated temperature in a mold of uniform cross section with sufficient pressure to bring all parts of said meat into firm contact, and chilling said meat while under said last-mentioned compression to congeal gelatinous substances within said ham, whereby said ham is bound in close coherence and is caused to retain its form having uniform cross section.

3. A process of meat treatment comprising compressing a boned piece of uncooked meat wrapped in fabric within a mold, securing said mold to maintain said meat under compression, chilling said meat while secured in said mold, removing said meat from said mold and fabric and subjecting it to a smoke treatment at an elevated temperature, compressing said meat while at elevated temperature in a mold to give it a desired form, and chilling said meat while compressed in said last-mentioned mold.

4. In a process for the treatment of hams so that they can be sliced into slices of uniform size and quality, the steps of smoke treating a ham after said ham has first been boned and formed into substantially smooth surface outline, said smoke treatment being at such temperature and under such conditions as to leave the gelatinous substances within said ham in a tacky uncongealed state, pressing said ham in a mold of predetermined form while said gelatinous substances are in a tacky uncongealed state, and chilling said ham while under pressure in said mold to congeal said substances and set said ham with coherence of internal parts and in said predetermined form.

5. A process of meat treatment comprising forming a piece of meat into a form approximately the final form desired, encasing said formed meat in a cellulose material for binding said meat in its formed state, subjecting said meat to a smoke treatment while at elevated temperature while suspended in a porous bag, removing said bag and cellulose material from said meat, compressing said meat in a mold of uniform cross section, chilling said meat while under compression in said mold and pressing said meat longitudinally from said mold.

6. A process as set forth in claim 5 in which said cellulose material is removed from the meat by first loosening it through subjection to contact with a warm liquid.

7. A process of meat treatment comprising compressing a piece of uncooked cured boned meat while in a soft pliable state to remove the bone cavity and smooth the surface outline, chilling said meat while under compression to preserve its compressed form upon release of said compression, subjecting said meat to a smoke treatment at an elevated temperature, compressing said meat at elevated temperature to cause it to assume a predetermined form and with sufficient pressure to bring all parts of said meat into firm contact, and chilling said meat while under said last mentioned compression to congeal said meat into close coherence in said predetermined form.

8. The method of producing an uncooked ham sales product which comprises laterally compressing a boned ham into general loaf shape, smoking while under lateral compression, and thereafter subjecting to supplemental longitudinal compression while warm and flaccid whereby to fill the voids and produce a cohesive product of substantially uniform cross section throughout its length.

9. The method of producing a meat sales product which comprises laterally compressing a boneless meat joint into general loaf form, heating to render flaccid and to increase the binding quality of the albumens, and thereafter longitudinally compressing in order more effectually to fill the voids and produce a cohesive product of substantially uniform cross section, whereby to adapt the product for slicing into uniform thin slices and marketing in units of definite shape and weight.

10. The method of producing a meat sales product which consists in laterally compressing a boneless meat joint into general loaf form, smoking to an internal temperature of the order of 130° F., thereafter subjecting to a thermofungicidal dry heat treatment at a temperature sufficiently high for a sufficient period of time to destroy putrefactive ferments but short of cooking, and thereafter longitudinally compressing to fill the voids and render cohesive and cause the loaf to assume a shape of substantially uniform cross section throughout its length.

KARL C. EIKEL.